ical Patent [19] [11] 4,104,262
Schade [45] Aug. 1, 1978

[54] WATER-DISPERSIBLE ESTER RESIN CONTAINING A MOIETY OF POLYACID OR BIVALENT ALCOHOL CONTAINING A SULFO GROUP

[75] Inventor: Gerhard Schade, Witten-Bommern, Germany

[73] Assignee: Dynamit Nobel Aktiengesellschaft, Troisdorf, Germany

[21] Appl. No.: 675,083

[22] Filed: Apr. 8, 1976

[30] Foreign Application Priority Data

Apr. 15, 1975 [DE] Fed. Rep. of Germany ....... 2516305

[51] Int. Cl.$^2$ ............................................. C08G 63/12
[52] U.S. Cl. ................................ 528/295; 260/29.2 E
[58] Field of Search .......................... 260/75 S, 29.2 E

[56] References Cited

U.S. PATENT DOCUMENTS

| 3,167,531 | 1/1965 | Parker et al. | 260/75 R |
|---|---|---|---|
| 3,310,512 | 3/1967 | Curtice | 260/75 R |
| 3,563,942 | 2/1971 | Heiberger | 260/75 S |
| 3,627,758 | 12/1971 | Weber et al. | 260/75 R |
| 3,725,348 | 4/1973 | Harrison et al. | 260/75 S |
| 3,725,351 | 4/1973 | Harrison et al. | 260/75 S |
| 3,734,874 | 5/1973 | Kilber et al. | 260/75 S |
| 3,779,993 | 12/1973 | Kibler et al. | 260/29.2 E |
| 3,853,820 | 12/1974 | Vachon | 260/75 S |
| 4,022,740 | 5/1977 | Morie et al. | 260/29.2 E |

FOREIGN PATENT DOCUMENTS 820,999 4/1975 Belgium ................................. 260/77.5

OTHER PUBLICATIONS

Chem. Absts. 83:165, 512v, Aqueous Anionic Polyurethane Latexes, Violland (Rhone-Progil).

*Primary Examiner*—Edward M. Woodberry
*Attorney, Agent, or Firm*—Burgess, Dinklage & Sprung

[57] ABSTRACT

A water-dispersible polycondensation polyester resin having moieties of at least one polycarboxylic acid and at least one polyvalent alcohol having a terminal hydroxyl group, said polyester having a molecular weight between 300 and 3,000, a softening point between 30° and 60° C, said polyester additionally containing an amount of 1 to 5 mole percent based upon the moieties of polycarboxylic acid or polyvalent alcohol; moieties of an alkali metal-sulfo group containing polycarboxylic acid or polyvalent alcohol; aqueous dispersions of such water-dispersible polyester resin and the use of such water dispersions as baked upon lacquer compositions.

24 Claims, No Drawings

4,104,262

WATER-DISPERSIBLE ESTER RESIN CONTAINING A MOIETY OF POLYACID OR BIVALENT ALCOHOL CONTAINING A SULFO GROUP

BACKGROUND OF THE INVENTION

1. Field of the Invention

This invention relates to water-dispersible polyester resins. More especially, this invention relates to aqueous dispersions of water-dispersible polyester resins characterized in that the polyester resin has commenced therein moieties containing a sulfo group which has been neutralized by an alkali metal such as sodium. Particularly contemplated are polyesters which are water-dispersible which contain moieties of an alkali metal, e.g., sodium salt of a sulfo-containing dicarboxylic acid or polyvalent alcohol. This invention also relate to the use of such polyesters in an aqueous dispersion as lacquer binding agents.

DISCUSSION OF THE PRIOR ART

Water-dispersible or water-soluble polyester resins have long been known. Thus, for example, alkyd resins which still have free carboxyl groups have been made water-dispersible through the formation of salts by the use of ammonia or amines (H. Wagner, H.F. Sarx, "Lackkunstharze," 4th Ed., Carl Hanser Verlag, Munich 1959, page 114). The dispersion principle has been applied substantially unchanged to various polyester resins which are to be employed as lacquer-binding mediums. The reason for adherence to this conception lies in the fact that the resin salts thus obtained lose the volatile base upon drying and are transformed into resin acids which remain only very slightly sensitive to water. In addition their carboxyl groups can be brought to the vanishing point through esterification or volume by the use of setting reactions such as occur when lacquer varnishes are baked on at elevated temperatures. Hence, the sensitivity to moisture of the resultant lacquer films prepared from such dispersions or aqueous solutions does not appear to be higher or at least not appreciably higher than those films prepared from similar polyester resins which contain no ammonium carboxylate groups and are formed by the use of solutions in conventional solids and hardeners.

However, the use of such ammonium or amine neutralized carboxylic acid-containing polyesters is hindered by the noticeable disadvantage that in use there is given off ammonia or amine vapors during the lacquering and/or hardening process. These fumes are distasteful it not noxious. The dispersions containing such resins additionally, as rule, require the use of an additional organic solvent or swelling agent for the purpose of improving flow characteristics, improving the wetting of the surface to be coated. Hence, during use these organic solvents or swelling agents also escape in vapor form thereby worsening the bad odors produced in the lacquering operation due to the ammonia or amine being given off. The state of the art is given in general in "Chemistry of Water-Soluble Polymers" by T. J. Miranda, Off. Digest, Oct. 1965, pages 62–69.

It would therefore become desirable to provide an improved water-soluble or water-dispersible polyester resin which is not characterized by ammonia or amine terminated carboxyl groups. More especially, it would become desirable to provide such a polyester resin which does not require the use of additional organic solvents or swelling agents to improve flow characteristics or improved surface wetting. More especially it has become desirable to provide such a polyester resin which can be readily dispersed or dissolved in water and can be readily employed as a lacquer binding medium which can be baked on rapidly at relatively low temperatures.

SUMMARY OF THE INVENTION

The objects of the present invention are provided by a water-dispersible polycondensation polyester resin having moieties of at least one polycarboxylic acid and at least one polyvalent alcohol of the terminal hydroxyl groups, said polyester having a molecular weight between 300 and 3,000, a softening point between 30° and 60° C wherein said polyester additionally contains an amount of 1 to 5 mole percent, based upon the moieties of polycarboxylic acids or polyvalent alcohols, moieties of an alkali metal-sulfo group containing polycarboxylic acid or polyvalent alcohol.

Generally speaking, the water-dispersible polyester resins of the present invention are made from a dicarboxylic acid or its ester and a bivalent alcohol having at least one terminal hydroxyl group, preferably having at least two terminal hydroxyl groups. The dicarboxylic acids which can be used include, 1,2-, 1,3- and 1,4-benzenedicarboxylic acids or their ester-forming derivatives, especially $C_1$–$C_4$ alkyl esters thereof, as well as linear and branched alkane dicarboxylic acids having 4 to 36 carbon atoms. These alkane dicarboxylic acids can additionally contain olefinic unsaturation. As examples of particularly contemplated alkane dicarboxylic acids there are: adipic acid, azelaic acid, sebacic acid, maleic acid and dimeric fatty acids. It is to be understood that a reference is made to moieties of a polycarboxylic acid or dicarboxylic acid but these moieties can be supplied from the corresponding ester or anhydride. Thus, the polyester can contain moieties of maleic acid which can be supplied by the use of maleic acid anhydride.

Thus it has now been found that the disadvantages as set forth above in the use of amine or ammonium terminated carboxyl-containing polyesters are eliminated through the use of the water-emulsifiable polyester resin of the present invention which consists essentially of radicals of dicarboxylic acids and polyvalent alcohols incorporated in the polyester by condensation which polyester contains substantially terminal hydroxyl groups and has a molecular weight of 300 to 3,000 and a softening point or glass transformation point between 30 and 60° C. Preferably, the softening point or glass transition point is between 35° and 45° C. The polyester is further characterized by the presence of 1 to 5 mole percent of radicals of a diol and/or a dicarboxylic acid which contains a sulfonic acid group. The compound is, however, in the form of the alkali metal salt, e.g., sodium salt of the sulfonic acid group containing dicarboxylic acid or bivalent alcohol.

Generally speaking the polyesters of the present invention are dispersible in water at 25° C in an amount of 70 to 20 weight percent. These aqueous dispersions can be employed as media to carry lacquer binding material on to a surface to be coated. There can be introduced into the aqueous dispersion containing polyester emulsifying agents, pigments and the like, as is known.

In order to adjust the required softening temperatures, it is necessary, as a rule, to use predominantly (i.e., in the amount of more than 50 mole%) one or more of the isomeric benzene dicarboxylic acids, especially isophthalic and/or terephthalic acid, or ester-forming derivatives thereof (anhydrides, low alkyl esters, preferably dimethyl esters), plus, to complete 100 mole%, one or more of the alkanedicarboxylic acids. All glycols having primary and/or secondary hydroxyl groups are basically usable, such as ethylene glycol, 1,2-propyleneglycol, 1,3- and 1,4-butyleneglycol, 2,2-dimethylpropanediol-1,3, 3-hydroxy-2,2-dimethylpropylhydroxypivalate, 2-ethylhexanediol-1,3,2,2-dimethylpentanediol-1,3, diglycol, triglycol and the like. The selection of the starting substances is furthermore limited by the fact that the ester resins are not to be crystallizable thermally nor by swelling, since crystallization impairs the stability of the dispersions and the adhesion of the lacquer films to the substrates, as a rule. It is accordingly desirable to use predominantly starting substances having an asymmetrical structure in relation to the principal polymer chain. It is furthermore important that the ester resins have acid numbers of less than 5, preferably of 0 to 2, since detectable acidity impairs the preparation and shelf life of the dispersions. In such cases it is possible to compensate a possibly too high acid number by the addition of bases to the dispersion being prepared, but this is not preferred, since it sacrifices, in part, the advantages which can be achieved by the invention.

Examples of compounds substituted with the alkali salt of a sulfo acid group, which are preferred on account of their easy availability, are the sodium salt of benzene-5-sulfo-1,3-dicarboxylic acid and the dimethyl ester thereof (hereinafter referred to as sodium sulfodimethyl-isophthalate or sodium sulfo-DMI); it is evident, however, that any other glycols or dicarboxylic acids having a sulfo group neutralized with alkali are usable instead of these products. Other dicarboxylic acids containing a sulfo group which are useful in the present invention in the form of an alkali salt include the following: sulfonaphthalene dicarboxylic acids, sulfoterephthalic acid, sulfo succinic acid, sulfonated fluorene 9,9-dipropione acids, their esters or similar compounds.

If it is desired to introduce the alkali metalsulfo group as a component of a bivalent alcohol the following compounds are particularly contemplated for such purpose: 2-sulfo butanediol, sulfo-m-(p-) xylyene glycol, oxyalkylated sulfonoited dihydric phenols, naphtholes (e.g. oxyalkylated chromotropic acid) and similar compounds, such as $\delta,\delta$-bis(-oxymethyl-tetramethylene sulfonat-1,3-($\beta$-sulfoethoxy)-1,2-propanediol or the reaction products of 1,3 propane sultone and polyalkohols described in GB-P 1151569.

The concentration of these alkali metal salts of sulfo acids in the ester resin is to be such that the softening temperature of the resin, after saturation with water, will be below the keeping temperature of the dispersion to be produced from the ester resin, i.e., a brittle lump of the ester resin should, after a reasonable time of immersion in cold water, become soft or smeary on the surface and at the same time opaque. In the case of relatively high softening points of the dry ester resin, this, of course, requires a higher concentration of hydrophilizing sulfo salt groups in the ester resin than in cases in which the softening temperature from the outset is lower. If the softening ranges are, as preferred, between 35° and 45° C, approximately 2 to 3 mole% of sulfo salt groups (with respect to the sum of the dicarboxylic acids used), or of the bivalent alcohols as the case may be, will be sufficient to produce the desired effect.

The preparation of the products of the invention is performed in a known manner by transesterification reactions and esterification reactions, respectively, as descirbed in principle in the above-mentioned book by H. Wagner and H.F. Sarx, beginning on page 92, and in the additional literature references given therein.

The molecular weights of the resins are, for practical reasons, to be as low as possible, i.e., in a range below 3000, preferably below 2000. In this specification the molecular weights have been determined by measuring the hydroxyl numbers and carboxyl numbers assuming, that the hydroxyl- and carboxyl-groups are the sole end groups of each molecule of polyester. One of the reasons for this practical requirement is that the higher the molecular weight of the resin is, the more slowly the melt viscosity of the resins decreases as the temperature rises above its softening point; a low melt viscosity at temperatures limited for practical reasons by the boiling point of water, i.e., 100° C, is, however, desirable, since the preparation of the dispersion is greatly facilitated by a low melt viscosity of the resin, so that simple vats equipped with anchor stirrers, and also, of course, equipped with heaters, will be sufficient for the dispersion of the resin. Another reason for this requirement is that the hydroxyl number diminishes as the molecular weight increases; it should not fall below about 35 if perfect setting is to be assured. Generally, the hydroxyl number ranges from 37 to about 370.

In the preparation of the dispersions, it is desirable to proceed by heating the ester resins sufficiently above their softening point to form an easily stirrable melt, then uniformly distributing pigments in the melt, if desired, with the aid of a dissolver or the like, incorporating other additives, if desired, such as leveling agents, additional emulsifiers, highboiling solvents or the like, and finally adding preheated water slowly, drop by drop, with stirring, whereupon first the resin mixture forms the continuous phase and later the water forms the continuous phase of the developing dispersion. Then the dispersion is let cool, and during or after the cooling a triazine resin serving as hardener is added, preferably hexamethoxymethylmelamine, which can be dissolved in the aqueous phase. The aqueous dispersion thus obtained can be thinned with water to the desired consistency even at storage temperature, and after several months no more than a small amount of sediment is formed, which can easily be redispersed simply by stirring.

The solid resin, however, can also be combined with all of the water in the cold, and the two components can be heated together with stirring; the mixture may become temporarily lumpy, but if the stirrer is sufficiently powerful this creates no difficulty. Lastly, it is also possible to heat the resin with only a portion of all of the water that is to be added, and after a conveniently stirrable consistency is achieved the rest of the water can be added to the mixture.

The water-soluble triazine resin required for the hardening should preferably not be present when the dispersions are being prepared, because in such cases the formation of crosslinked particles can occasionally be observed, which can considerably detract from the appearance of the baked-on coatings prepared from the dispersions. Generally, the triazine resin is employed in an amount of between 10 and 40 weight percent. Triazine resins particularly contemplated include: pentamethoxymethylmelamine, hexamethoxymethylmelamine, hexaathoxymethylmelamine, pentaathoxymethylmelamine, tetraathoxybenzoguanamine, tetramethoxyguanamine, their mixtures and/or not fully etherified hydroxymethyl-precursors.

It is also possible, and often desirable, when preparing the dispersions, to use external emulsifiers, such as for example an emulsifier obtainable commercially under the name Emulsogen EL, since this increases many times the storage stability of the dispersions without entailing any apparent disadvantages.

Instead of dispersing pigments into the melted resin, suitable pigment preparations can be incorporated afterwards into the resin dispersions in a known manner.

The dispersions thus prepared can be applied in a conventional manner to metal objects, and then, at room temperature or slightly above, they surprisingly form, within only 0.5 to 2 minutes, a coherent and, as a rule, high-gloss lacquer film which does not wipe off and which can then be baked on, with the liberation only of water and a little formaldehyde and methanol originating from the hexamethoxymethylmelamine.

Conventional resin dispersions, in contrast, require, as a rule, about 30 to 90 minutes for the physical drying process at room temperature, under comparable conditions.

The baked-on coatings thus obtained are, if the resin composition is suitable, hard, very glossy, strongly adherent, elastic, and surprisingly not perceptibly more sensitive to the action of water than similarly composed products which contain no sulfo salt groups and have been applied in a conventional manner in the form of solutions in organic solvents.

Furthermore, it is possible, through the appropriate selection of the bifunctional starting substances, to prepare emulsifier ester resins which are fluid at room temperature. In this case, when triazine resins were used as hardeners, either excessively soft and elastic coatings were obtained, or else hard but excessively brittle coatings, depending on the concentration of the triazine resins.

In order the more fully illustrate the nature of the invention and the manner of practicing the same the following examples are presented:

EXAMPLES

EXAMPLE 1

131.9 g of dimethylterephthalate (0.68 mole), 6.26 g of sodium sulfodimethylisophthalate (0.02 mole), 34.1 g of ethylene glycol (0.55 mole), 65 g of neopentylglycol (0.625 mole) and 0.150 g of titanate catalyst (prepared by the reaction of 1 mole of tetra-n-butyl titanate with 4 moles of 2-ethylhexanediol-1,3 and removal of the butanol by distillation) were transesterified under a nitrogen atmosphere for 5 hours at a temperature increasing from 180° to 210° C, after which time 53 ml of distillate with a boiling point of 65° to 75° C had passed over. Then 33.2 g of isophthalic acid (0.2 mole) and 20.2 g of sebacic acid (0.1 mole) were added to the hot melt and esterified with the transesterification mixture at temperatures increasing from 210° C to 240° C over a period of 2 hours. Then a vacuum of about 300 Torr was applied for 30 minutes, followed by a vacuum of 25 Torr for an additional 30 minutes, after which no more perceptible amounts of distillate passed over. The very fluid melt was then poured out and hardened to a brittle resin whose glass transformation temperature, determined by differential thermoanalysis, amounted to 40° to 45° C. The resin was hammered to fragments, and placed in a glass beaker of 5 cm diameter under a 5 kg weight; under these conditions the product proved to be stable in storage all the way up to 35° to 40° C; no sign of caking was observed.

The hydroxyl number of the resin was 60 mg KOH/g, the acid number was less than 1 mg KOH/g, and the average molecular weight was accordingly about 1870.

The resin was heated at 90° C in the presence of 2 wt.-% of Emulsogen EL (Farbwerke Hoechst AG), and formed an easily stirred melt. Water heated at 80° to 95° C was added drop by drop to this melt, with stirring, a water-in-oil dispersion forming at first and then, as more water was added, being transformed to an oil-in-water dispersion. Stirring was continued for about 1 hour at 90° C, and then the dispersion was let cool. After this dispersion, containing equal parts of water and resin by weight, had been let stand for 60 days at room temperature, no settling out of the resin was observable.

In 89 parts of this dispersion, 11 parts of hexamethoxymethylmelamine were dissolved in about 50° C, and the lacquer thus obtained was applied to sheet aluminum (Alodine 1200) of 0.8 mm thickness. After about 1 minute at 20° C, the cloudy dispersion had set to form a smooth, glossy, wipe-resistant and homogeneous film. This film was baked on both for 10 minutes at 210° C and for 60 seconds at 310° C, whereafter a dry film thickness of 25 microns was measured. Irrespective of the baking conditions described above, the following test results were obtained:

| | |
|---|---|
| Gloss according to Gardner (60°: ASTM D 523) | 100% |
| T-bend test (E.C.C.A. Test Procedure T 7) | 0 |
| Impression hardness according to Buchholz (DIN 53,153) | 111 |
| Erichsen cupping (DIN 53,156) | 9.5 mm |
| Impact test (ASTM D 2795-69, diam. ⅝ inch) | >80 inch-pounds |
| Rubbing test with methyl ethyl ketone | >100 strokes |

Then a conventional ester resin was prepared in the same manner as described above, except that the sodium sulfo dimethyl isophthalate contained therein was replaced with the equivalent amount of dimethyl terephthalate. This resin proved to be non-dispersable, and was dissolved in ethyl glycol acetate; 11 parts of hexamethoxymethyl melamine were added per 45 parts of resin, and the clear lacquer was also baked onto sheet aluminum for 10 minutes at 210° C. With the identical dry film thickness, the piece of aluminum thus prepared was immersed into boiling water together with the piece lacquered with the aqueous dispersion. After 2 days in the water and 5 hours of lying exposed to the air, the lead pencil hardness of both of the externally still intact films had diminished identically from H — 2H to H — HG; no loss of gloss was observable. Accordingly, the lacquer film in which sodium sulfo dimethylisophthalate had been incorporated by condensation was, contrary to expectations, not definitely more sensitive to moisture than a lacquer film containing no salt groups but otherwise of the same composition.

To prepare a pigmented lacquer, the resin containing sodium sulfodimethylisophthalate incorporated by condensation was heated at 90°-95° C in the presence of 3% Emulsogen EL, and for each 32 weight parts of resin 16 weight parts of titanium dioxide were dispersed therein by means of a pearl mill, with the addition of 0.1 parts of a wetting agent (FC 430; 3M Corp., Detroit, Mich., USA) and of an antisettling agent (Nopcosant K; Nopco-Munzing GmbH, Heilbronn). Then water heated to approximately 90° C (35 parts) was gradually added, and the mixture was stirred for 1 hour at 90° C. The dispersion thus obtained was stirred at about 50° C with eight parts of hexamethoxymethylmelamine. In this case, again, no evidence of settling was observed two months later. After this lacquer had been air dried and then baked onto sheet aluminum (60 sec., 310° C), the following test results were measured on coating thicknesses of 25 microns:

| | |
|---|---|
| Gloss according to Gardner (60° C, ASTM D 523) | 100% |
| T-bend test (E.C.C.A. Test Procedure T 7) | 2 |
| Impression hardness, Buchholz (DIN 53,153) | 111 |
| Erichsen cupping (DIN 53,156) | 7.4 mm |
| Impact Test (ASTM D 2795-69, diam ⅝ inch) | >80 inch-pounds |
| Rubbing Test with methyl ethyl ketone | >100 strokes |

EXAMPLES 2-5

Using the same procedure as in Example 1, the following ester resins were prepared, which when combined with 20 weight-parts of hexamethoxymethylmelamine and 2% Emulsogen EL (Farbwerke Hoechst AG) per 80 weight-parts of ester resin, in all cases produced storage-stable dispersions having a 50% solid content:

| Ex. No. | Composition | Glass Transformation temp. (° C) |
|---|---|---|
| 2 | DMT/Na-sulfo-DMI/IPS/SS-EG/NPG 48/2/40/10 - 55/62.5 (mole %) | 35 – 42 |
| 3 | DMT/Na-sulfo-DMI/IPS-EG/BG 67/3/30 - 55/62.5 (mole %) | 51 – 60 |
| 4 | DMT/Na-sulfo-DMI/IPS/AZ-EG/PD 78/2/10/10 - 55/62.5 (mole %) | 30 – 36 |
| 5 | DMT/Na-sulfo-DMI/IPS/AD/MSA-EG/NPG 55/2/23/10/10 - 55/62.5 (mole %) | 40 – 48 |

The abbreviations in the above tables have the following meaning:
DMT = Dimethylterephthalate
IPS = Isophthalic acid
SS = Sebacic acid
AZ = Azelaic acid
AD = Adipic acid
MSA = Maleic acid anhydride
EG = Ethylene glycol
NPG = Neopentylglycol
BG = Butane-1,3-diol
PD = Propylene-1,2-diol The values given in mole-% refer in these examples to the quantity ratios of the starting materials used in forming the resin, but not to the monomer radicals incorporated into the resins by condensation. The acid numbers were in all cases from 0 to 1 mg KOH/g, and the hydroxyl numbers between 40 and 70 mg KOH/g.

What is claimed is:

1. A water-dispersible polycondensation polyester resin having moieties of at least one dicarboxylic acid and at least one bivalent alcohol having terminal hydroxyl groups, said polyester having a molecular weight between 300 and 3,000, a softening point between 30° and 60° C, a hydroxyl number of at least 35 mg KOH/g, an acid number of less than 5 wherein said polyester additionally contains an amount of 1 to 5 mole percent, based upon the moieties of polycarboxylic acid or bivalent alcohol, moieties of an alkali metal - sulfo group containing polycarboxylic acid or bivalent alcohol.

2. A polyester according to claim 1 wherein said polyester contains 1 to 5 mole percent of an alkali metal-sulfo group containing dicarboxylic acid, based upon the number of dicarboxylic acid groups in said polyester.

3. A polyester according to claim 1 wherein said polyester contains 1 to 5 mole percent of an alkali metal-sulfo containing bivalent alcohol, based upon the number of moieties of bivalent alcohol in said polyester.

4. A polyester according to claim 1 wherein said polyester contains 2 to 4 mole percent of an alkali metal-sulfo group containing dicarboxylic acid based upon the number of dicarboxylic acid groups in said polyester.

5. A polyester resin according to claim 1 wherein said polyester contains 2 to 4 mole percent of an alkali metal-sulfo group containing bivalent alcohol, based upon the number of moieties of bivalent alcohol in said polyester.

6. A polyester resin according to claim 1 wherein the polyester has a molecular weight below 2,000.

7. A polyester according to claim 1 wherein the moieties of polycarboxylic acid free of alkali metal - sulfo groups are dicarboxylic acids and are selected from the group consisting of moieties of 1,2-benzenedicarboxylic acid, moieties of 1,3-benzenedicarboxylic acid, moieties of 1,4-dicarboxylic acid and moieties of alkane dicarboxylic acids having 4 to 36 carbon atoms.

8. A polyester according to claim 7 wherein the moieties of dicarboxylic acid free of alkali metal - sulfo groups are moieties of an alkanedicarboxylic acid having 4 to 36 carbon atoms which is selected from the group consisting of adipic acid, azelaic acid, sebaic acid, maleic acid and dimeric fatty acids.

9. A polyester according to claim 1 having an acid number of 0 to 2.

10. A polyester according to claim 1 wherein the bivalent alcohols are selected from the group consisting of ethylene glycol, 1,2-propylene glycol, 1,3-butylene glycol, 1,4-butylene glycol, 2,2-dimethylpropanediol-1,3, 3-hydroxy-2,2-dimethylpropylhydroxylpivalate, 2-ethylhexanediol-1,3, and 2,2-dimethylpentanediol-1,3.

11. A polyester according to claim 1 containing a moiety of the sodium salt of benzene-5-sulfo-1,3-dicarboxylic acid.

12. An aqueous dispersion of the polyester of claim 1.

13. An aqueous dispersion according to claim 12 wherein the polyester is present in an amount of 70 to 20 weight percent.

14. A polyester according to claim 12 containing a pigment.

15. A polyester resin according to claim 1 which is dispersible in water in an amount of 20 to 70 weight percent at 25° C.

16. A water-dispersible polycondensation polyester according to claim 1 containing more than 50 mol percent of one or more isomeric benzene dicarboxylic acids.

17. A polyester according to claim 16 additionally containing one or more alkane dicarboxylic acids.

18. A polyester according to claim 1 having an acid number of 0 to 1 mg KOH/g and a hydroxyl number between 40 and 70 mg KOH/g.

19. A polyester according to claim 1 wherein the acid moieties comprise a mixture of dimethyl terephthalate, sodium sulfodimethylisophthalate, isophthalic acid and sebacic acid and the bivalent alcohol moieties comprise a mixture of ethylene glycol and neopentylglycol.

20. A polyester according to claim 1 wherein the acid moieties comprise a mixture of dimethyl terephthalate, sodium sulfodimethylisophthalate and isophthalic acid and the bivalent alcohol moieties comprise a mixture of ethylene glycol and butane-1,3-diol.

21. A polyester according to claim 1 wherein the acid moieties comprise a mixture of dimethyl terephthalate, sodium sulfodimethylisophthalate, isophthalic acid and azelaic acid and the bivalent alcohol moieties comprise a mixture of ethylene glycol and propylene-1,2-diol.

22. A polyester according to claim 1 wherein the acid moieties comprise a mixture of dimethyl terephthalate, sodium sulfodimethylisophthalate, isophthalic acid, adipic acid and maleic acid anhydride and the bivalent alcohol moieties comprise a mixture of ethylene glycol and noepentylglycol.

23. A polyester according to claim 1 wherein the acid moieties comprise a mixture of dimethyl terephthalate and sodium sulfodimethylisophthalate and the bivalent alcohol moieties comprise a mixture of ethylene glycol and neopentylglycol.

24. A polyester according to claim 1 wherein the hydroxyl number of 37 to 370 mg KOH/g.

* * * * *